United States Patent

Buczek et al.

[15] 3,646,468
[45] Feb. 29, 1972

[54] SERVO AIDED INJECTION PHASE-LOCKED LASER OSCILLATOR

[72] Inventors: Carl J. Buczek, Manchester; Michael L. Skolnick, Monroe; Robert J. Freiberg, South Windsor, all of Conn.

[73] Assignee: United Aircraft Corporation, East Hartford, Conn.

[22] Filed: Mar. 20, 1970

[21] Appl. No.: 21,319

[52] U.S. Cl. ...................... 331/94.5, 330/4.3, 356/106 LR
[51] Int. Cl. ........................................ H01s 3/00, G01b 9/02
[58] Field of Search .................... 331/94.5; 356/106; 330/4.3

[56] References Cited

UNITED STATES PATENTS 3,479,612  11/1969  Seidel ................................. 331/94.5

Primary Examiner—Ronald L. Wibert
Assistant Examiner—V. P. McGraw
Attorney—Melvin Pearson Williams

[57] ABSTRACT

A high-power laser oscillator is overcoupled, thereby to be oscillating at below maximum output power, and laser radiation injected into the high-power oscillator from a low-power, controlled driving oscillator drives the total radiation intensity within the high-power oscillator to an output power approaching its maximum value. This permits the high-power oscillator output to be sharply maximized when it is adjusted so that its resonant frequency is close to that of the driving oscillator, thereby permitting closed loop servocontrol of the high-power oscillator cavity length in response to maximum power output to cause the cavity length to match the transition frequency of the driving oscillator closely enough for stable phase locking of the two oscillators. In one embodiment, a ring interferometer high-power oscillator is operated in one direction only thereby preventing feedback from this oscillator to the driving (low-power reference) oscillator. In another embodiment, an optical isolator is used between the high low-power reference oscillator and the power oscillator.

5 Claims, 4 Drawing Figures

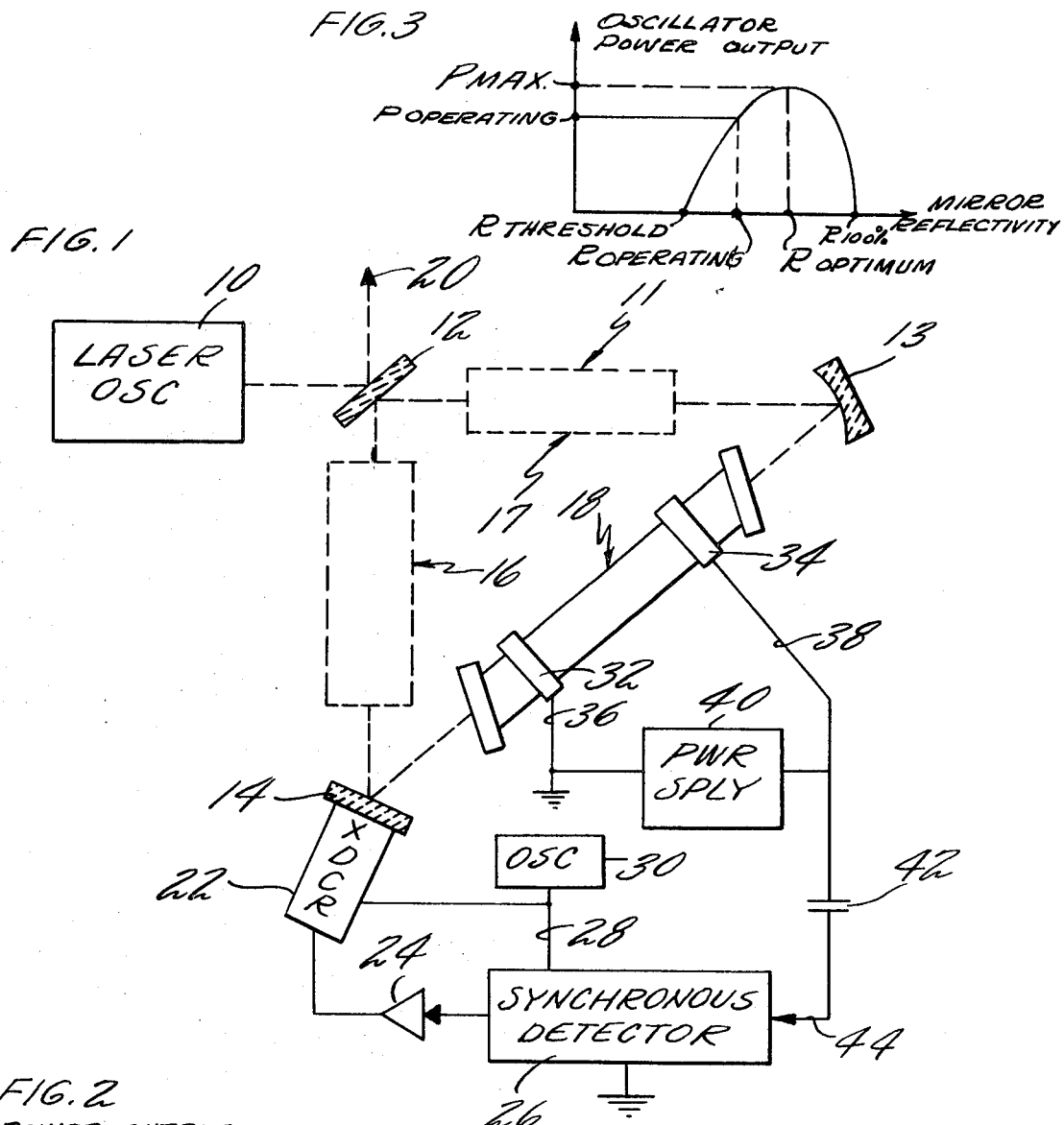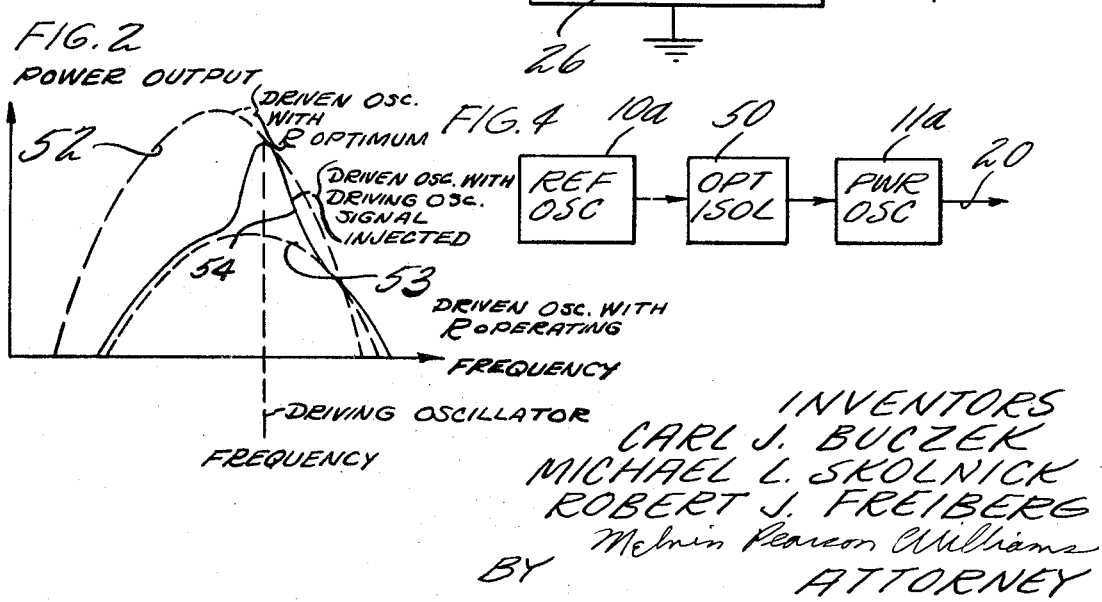

SERVO AIDED INJECTION PHASE-LOCKED LASER OSCILLATOR

BACKGROUND OF THE INVENTION

1. Field of Invention

This invention relates to lasers and more particularly to a high-power driven laser oscillator phase locked to the center frequency of a driving low-power reference laser oscillator.

2. Description of the Prior Art

In the high-power laser art, it is known that maximum efficiency and power output from a given laser gain medium is achieved only if the gain medium is operated with the intensity of radiation near the saturation intensity for the gain medium. On the other hand, optimization of spectral quality and output frequency stability is best achieved in relatively low-power, small configurations. Therefore, it has been suggested that a high-power laser oscillator be phase locked to a carefully controlled low-power oscillator by injecting the signal from the low-power oscillator into the high-power oscillator. The parameters of the two oscillators would be so chosen that the oscillators will supposedly phase lock together, and if feedback is prevented from the high-power oscillator to the low-power oscillator, the output of the high-power oscillator is supposedly governed in terms of its spectral characteristics by the low-power oscillator. However, because of the instabilities of any laser cavity, and particularly the instabilities in a high-power laser oscillator, it has heretofor been impractical to achieve a useful oscillator-oscillator combination as suggested.

In the laser art, it is known to use hill climbing servos with an oscillator cavity so as to tune the physical resonance of the oscillator cavity to the transition frequency of the gain medium chosen for operation. However, in oscillator-oscillator configurations, this would not be possible since the power oscillator, if servoed toward a resonance, would merely servo toward the transition frequency of its own gain medium which, for a variety of reasons, can be different from the low-power driving oscillator frequency. In fact, it is nearly impossible to ensure that the transition frequency of the high-power oscillator gain medium is the same as the output frequency of the oscillator.

SUMMARY OF THE INVENTION

The object of the present invention is to provide a phase-locked laser oscillator-oscillator configuration.

According to the present invention, a low-power laser reference oscillator is coupled, with suitable feedback isolation, to a high-power laser oscillator, the parameters of the oscillators being chosen so that the frequencies of operation thereof are nearly the same, physical resonance of the high-power oscillator being controlled to match the output frequency of the low-power reference oscillator. In accordance further with the present invention, the gain of the high-power oscillator is controlled to provide less than saturation intensity of radiation therein as a result of self-oscillation, reaching saturation intensity only at the transition frequency of the reference oscillator as a result of the additional flux injected thereinto from the reference oscillator.

The present invention allows operating a high-power laser configuration in the oscillatory mode, thereby operating at saturation intensity of the laser medium, for maximum efficiency, gain and output power, while maintaining the advantage of the low-power oscillator in control over the spectral quality thereof. Additionally, the present invention is relatively simple to assemble and control, and can be implemented in a wide variety of configurations for numerous different applications.

Other objects, features and advantages of the present invention will become more apparent in the light of the following detailed description of preferred embodiments thereof, as illustrated in the accompanying drawings.

BRIEF DESCRIPTION OF THE DRAWINGS

FIG. 1 is a simplified schematic diagram of a preferred embodiment of the present invention including a ring interferometer power oscillator;

FIG. 2 is an illustration of power output as a function of frequency in a high-power oscillator operated in accordance with the present invention;

FIG. 3 is an illustration of power output as a function of output mirror reflectivity in a laser employing the present invention; and FIG. 4 is a simplified schematic block diagram of the general oscillator-isolator-oscillator arrangement for the present invention.

DESCRIPTION OF THE PREFERRED EMBODIMENT

Referring now to FIG. 1, a preferred embodiment of the present invention includes a low-power laser reference driving oscillator 10 which may be of any suitable well-known variety. In the example used herein, it is presumed that the laser oscillator is a $CO_2$ oscillator operating at about 10.6 microns. The maximum advantage of the present invention is derived when the oscillator is spectrally pure and has a closely controlled frequency. On the other hand, however, the present invention will work in response to oscillators of less sophistication, as desired. The high-power laser oscillator in accordance with the present invention comprises a ring interferometer 11 formed by a plurality of mirrors 12–14, the mirror 12 being partially transparent so as to receive into the ring interferometer the laser radiation output from the oscillator 10. One or more of the mirrors, such as the mirror 13 may be concave to enhance oscillator operation, or all three mirrors may be flat. Optical gain medium is included within the optical path of the ring interferometer; for instance, three different laser gain chambers 16–18 may be included as shown in FIG. 1, or a single laser chamber, such as the chamber 18, may be utilized if desired. A small amount of input radiation from the reference oscillator 10 through the mirror 12 will cause additional radiation in the clockwise direction only within the oscillator 11, and with the spacing of the mirrors 12–14 properly adjusted (as described hereinafter), the oscillator 11 will be resonant at the output frequency of the reference oscillator 10 and therefore the small input radiation will reinforce the flux caused by self-oscillation within the oscillator 11, and therefore the net flux will build up to saturation intensity. Thus, a major objective of the present invention is achieved in that maximally efficient optical power generation is achieved by operating a high-power oscillator at saturation phase locked to a spectrally pure input reference signal of an intensity less than that of the output of the high-power oscillator.

As illustrated in FIG. 1, the resonance of the oscillator 11 may be adjusted by adjusting the position of the mirror 14 by means of a transducer 22 in response to a discriminant error signal supplied thereto by an amplifier 24 (which may include suitable filtering), generated at the output of a synchronous detector 26. The synchronous detector 26 has an oscillatory voltage applied to a reference input 28 from an oscillator 30, the oscillator also supplying a dithering voltage to the transducer 22. As a result of the dithering voltage supplied to the transducer 22, the resonant frequency of the cavity is dithered. Amplitude modulation of the laser output beam 20 results from varying the resonant frequency of the high-power oscillator 11 around the frequency of the input flux from the reference oscillator. The amplitude modulation variation in the output beam 20 is monitored by sensing the concomitant variations which result therefrom in the impedance of the electrical discharge plasma of one of the gain chambers 16–18, herein shown to be the gain chamber 18. A pair of electrodes 32, 34 include respective connections 36, 38 to a suitable high voltage, current regulated DC power supply 40, the electrodes and the power supply 40 being so chosen with respect to the gain medium so as to provide an electric discharge plasma within the gain chamber 18, whereby to excite upper laser levels of energy in the laser gain medium as a result of electron collisions, all as is well known in the art. With a constant current power supply 40, any change in the impedance within the plasma between the electrode 32, 34 results in a change of voltage therebetween, which change in voltage can be coupled by a capacitor 42 to a signal input 44 of the synchronous detector 26. Thus, as the output power 20 varies as a result of modulation of the resonant frequency of the oscillator 11, the capacitor 42 couples a concomitant variation in the voltage between the electrodes 32, 34 to the synchronous detector 26. The output of the synchronous detector 26 is an error voltage having a magnitude depending on the magnitude of voltage at the signal input 44, and a polarity depending upon the relative phase difference between the signal input 44 and the reference input 28. Thus, the voltage applied by the amplifier 24 to the transducer 22 tends to drive the transducer so as to move the mirror toward a position at which the resonant frequency of the oscillator 11 will coincide with the output frequency of the reference oscillator 10.

In operation, the reflectivity of the output coupling mirror 12 is chosen to be less than the reflectivity required for maximum power output as illustrated in FIG. 3. In other words, the transmissivity of the mirror is chosen so that a greater portion of flux is coupled out than would be if the reflectivity were chosen for maximum output power as a result of self-oscillation on the high-power oscillator 11 operating alone. If the mirror 12 has the optimum reflectivity to provide maximum power output from the oscillator 11, the high-power oscillator would have a power versus frequency characteristic as is represented by curve 52 in FIG. 2. Alternatively, if the oscillator 11 is overcoupled so that the actual operating reflectivity provides less than the maximum output power (as is shown in FIG. 3) the high-power oscillator operates with a power versus frequency characteristic as is represented in FIG. 2 by curve 53. Actually, when a stable-frequency signal from the low-power reference oscillator 10 is injected into the high-power oscillator 11 which is operating with a characteristic as is represented by curve 54 in FIG. 2, thereby providing an enhanced peak in the output power at the same stable frequency as the reference oscillator and the magnitude of the peak in the power approaches the maximum power possible in the oscillator 11. It is to be noted that thus, with the driving oscillator 10 operating at a particular frequency, there is a very sharp peak in the output power versus frequency characteristic of the combined oscillators 10, 11 centered around the output frequency of the reference driving oscillator 10. Thus, the present invention provides an output power versus frequency characteristic which is maximized at the output frequency of the reference oscillator 10 rather than maximized at a preferred transition frequency of the gain medium of the high-powered oscillator 11. This makes it possible to sense overall output power and to adjust the physical resonance of the high-powered oscillator for maximum high-power oscillator output, thereby to ensure that the physical resonance of the high-power oscillator is tuned to the output frequency of the driving oscillator.

It is a particular feature of the present invention that because of the fact that the sharp peak in the output power characteristic extends across a wider frequency range than the range of frequency difference at which the high-power oscillator will phase lock to the driving oscillator, the present invention requires only that the servo maintain the physical resonance of the high-powered oscillator somewhere within the high-power output frequency range (i.e., within the peak of curve 54, FIG. 2) so that the high-power oscillator will become phase locked with the driving reference oscillator even though its resonance may be somewhat off the exact frequency of the reference oscillator. This being true, it is immaterial that the physical resonance of the high-powered oscillator is being dithered as described hereinbefore since this will not show up in any material fashion as a frequency modulation of the output beam. In fact, if the driving oscillator 10 is stabilized without frequency modulation of its output, such as is described in a copending application of Michael L. Skolnick entitled DITHERED GAIN CHARACTERISTIC STABILIZATION OF A GAS LASER, Ser. No. 21,262, then the output of the high-power oscillator, when servo aided injection phase locking is employed in accordance with the present invention, will similarly have no material frequency modulation.

Although in the present invention a ring interferometer has radiation injected therein in a single direction from the oscillator, thereby to provide feedback isolation between the power oscillator and the driving oscillator, it should be understood that, as shown in FIG. 4, any reference oscillator 10a and high-powered oscillator 11a having a suitable optical isolator 50 may employ the present invention, in accordance with teachings known in the art. The sole criterion of the present invention being to provide an overall power output versus frequency gain characteristic of the combined oscillators which has a relatively sharp peak at the output frequency of the reference oscillator, together with a servosystem for driving the physical resonance of the high-powered oscillator to within the spectrum of the relatively sharp combined peak, whereby phase locking of the two oscillators may occur.

Also, the foregoing represents a preferred, reflective embodiment of the present invention utilizing only one mirror with transmissivity, the other two (or more mirrors) being fully reflective. Also, the reference oscillator input is coupled through the same mirror that coupled the high-power oscillator output. Alternative embodiments of the present invention may comprise a variety of configurations; one such is illustrated in FIG. 2 of a copending application of Buczek and Skolnick entitled TRAVELLING WAVE REGENERATIVE AMPLIFIER, Ser. No. 21,320, filed on even date herewith. Therein, an amplifier comprises three mirrors two of the mirrors being partially transmissive, and one mirror being fully reflective. As is known, the roles may be reversed and the travelling wave interferometer may be used as the reference oscillator and a Fabray-Perot or other oscillator as the power oscillator. Note that the embodiment of FIG. 1 utilizes three gain chambers although one or two gain chambers may be utilized if desired. Similarly, although the embodiment of FIG. 1 is illustrated in terms of a three-mirror ring interferometer, it should be understood that any number of mirrors may be utilized so as to provide a polygon suitable for any given utilization of the present invention. Similarly, the invention is described herein primarily in connection with a $CO_2$ laser since this laser readily adapts itself to high-power operation and is a preferred type of laser in current technology. Additionally, as is known in the art, instead of using totally reflecting mirrors, a suitable arrangement of prisms and/or gratings and may be utilized so as to cause the optical path to close on itself, thereby providing a ring interferometer, a partially transmitting mirror being used where required to couple the input power in the output power from the oscillator 11. On the other hand, rather than utilizing partially transmitting mirrors, defraction or other type coupling known in the art may be utilized to provide the input and output to and from the amplifier, in accordance with techniques known in the art. Thus, although the invention has been shown and described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. Laser apparatus comprising:
   a low-power laser reference oscillator;
   high-power laser oscillator means having resonator means including coupling means for coupling the output of said low-power laser reference oscillator into said high-power laser oscillator means with feedback isolation to prevent said high-power laser oscillator means from feeding back to said low-power laser driving coupling with transmissivity which is greater than that required for maximum output power coupling of self-oscillation therein; and means responsive to the magnitude of output power coupled from said high-power laser oscillator means for adjusting the physical resonance of said high-power laser oscillator means to be within a range of frequency at which phase locking exists between the two oscillators.

2. A laser apparatus according to claim 1 wherein the transmissivity of said output coupling means is sufficient to transmit the flux resulting from self-oscillation of the high-powered laser oscillator means added to the flux injected into said high-power laser oscillator means from said low-power laser reference oscillator.

3. A laser apparatus according to claim 1 wherein said high-power laser oscillator means comprises a travelling wave interferometer.

4. A laser apparatus according to claim 3 wherein said travelling wave interferometer comprises a ring interferometer includes a partially transmissive input and output coupling mirror oriented at a 45° angle to the input flux and including flux path defining means to cause output flux to pass through said input and output coupling mirror in a direction perpendicular to said input flux.

5. A laser apparatus according to claim 4 wherein said flux path defining means comprises a pair of mirrors oriented with respect to said input and output coupling mirror to create a flux path configured in the shape of an equilateral right triangle with said input and output coupling mirror disposed at the apex thereof.

* * * * *

PO-1050
(5/65)

UNITED STATES PATENT OFFICE
CERTIFICATE OF CORRECTION

Patent No. 3,646,468          Dated February 29, 1972

Inventor(s) Carl J Buczek, Michael L. Skolnick & Robert J. Freiberg

It is certified that error appears in the above-identified patent and that said Letters Patent are hereby corrected as shown below:

Column 5, line 1     after "driving" insert -- oscillator, said coupling means also providing output power --

Signed and sealed this 6th day of June 1972.

(SEAL)
Attest:

EDWARD M. FLETCHER, JR.
Attesting Officer

ROBERT GOTTSCHALK
Commissioner of Patents